United States Patent [19]

Matsubara et al.

[11] Patent Number: 5,541,694
[45] Date of Patent: Jul. 30, 1996

[54] LIGHT SHIELDING BLADE CAULKING PIN

[75] Inventors: Takashi Matsubara; Hiroyuki Ohshima; Masanori Hasuda, all of Yokohama, Japan

[73] Assignee: Nikon Corporation, Tokyo, Japan

[21] Appl. No.: 551,001

[22] Filed: Oct. 31, 1995

Related U.S. Application Data

[63] Continuation of Ser. No. 248,010, May 24, 1994, abandoned.

[30] Foreign Application Priority Data

| May 24, 1993 | [JP] | Japan | 5-144326 |
| Jul. 7, 1993 | [JP] | Japan | 5-168098 |
| Sep. 17, 1993 | [JP] | Japan | 5-231121 |

[51] Int. Cl.[6] ............... G03B 9/10; G03B 9/32
[52] U.S. Cl. ................. 354/250; 354/242
[58] Field of Search ................. 354/236, 246, 354/242, 250

[56] References Cited

U.S. PATENT DOCUMENTS 4,956,139  9/1990  Koizumi et al. ............ 264/156
4,962,202  10/1990  Fukuda et al. ............ 354/246
4,965,617  10/1990  Matsubara ............ 354/246
5,025,278  6/1991  Matsubara ............ 354/246

*Primary Examiner*—David M. Gray
*Assistant Examiner*—Nicholas J. Tuccillo

[57] ABSTRACT

A caulking pin joint for use with a light shielding blade in a shutter or aperture mechanism of a camera. The caulking pin has a disc-shaped head, a circular protrusion depending therefrom, and a hollow-circular segment depending from the circular protrusion. The actuation arm of the shutter or aperture rests on the head, while the light shielding blade rests on the circular protrusion. The hollow circular section is then spread outward so as to rotatably secure the actuator arm to the light shielding blade. The interior surface of the hollow circular section is chamfered such that when it is folded over on top of the light shielding blade, it presents only a small smooth protuberance from the light shielding blade. This allows a second light shielding blade to be positioned close to the first light shielding blade without fear of collisions or interference between the blades. The circular protrusion upon which the light shielding blade rests, may be provided with a surface inclined up to and including 15° for receiving the light shielding blade. A punch and dye is used to deform both the hollow section and the periphery of the insertion hole in the light shielding blade.

26 Claims, 3 Drawing Sheets

LIGHT SHIELDING BLADE CAULKING PIN

This application is a continuation of application Ser. No. 08/248,010, filed May 24, 1994, now abandoned.

BACKGROUND OF THE INVENTION

1. Field of the Invention

The present invention relates to a caulking pin for use in connecting light shielding blades to actuation arms for use in shutters and apertures of cameras, and more particularly to a caulking pin for use in high speed camera shutter and aperture mechanisms.

2. Description of the Related Art

In recent years, due in part to improvements in film speed, cameras have come on the market having, shutter speeds as high as 1/8000th of a second and strobe synchronization speeds in the range of 1/250th of a second. Designing shutter and aperture mechanisms capable of handling such high speeds has proven difficult due to the close proximity each light shielding blade has with the adjacent light shielding blades.

Conventional focal plane shutters typically have a main arm and a subarm, which are respectively connected to a shutter base and multiple divided shielding blades. These connections typically use a caulking pin joint which allow the blades to rotate freely in a parallel linkage. When the shutter is open, the separate light-shielding blades are folded on top of each other at the outside of the exposure window. In order to close the shutter, the drive arm causes the blades to slide past each other and unfold, thereby covering the exposure window. Generally, the blades are rotated from the spread-out position into the folded position and placed on top of another. As the blades must lie extremely close together, in order to block incoming light, the tolerances in the construction of the shutter are very tight.

FIG. 6 shows the structure of a conventional caulking pin joint. An arm 1 is rotatably connected to a light shielding blade 2 via caulking pin 3. Caulking pin 3 comprises a disc-shaped body 3a having a circular protrusion 3c depending there from. The circular protrusion 3c has a smaller diameter than the disc-shaped body 3a and is adapted for insertion into an insertion hole in arm 1. Depending from the circular protrusion 3c, is a hollow circular section 3b having a diameter smaller than the circular protrusion 3c. The diameter of the hollow circular section 3b is such that it is adapted to fit within an insertion hole in light shielding blade 2. Prior to assembly, the light shielding blade 2 undergoes an embossing finishing through press molding, such that the section around the insertion hole is raised, via slanted section 2a, so as to be on a different plane from the remainder of the blade 2b. After insertion into the arm and light shielding blade, the circular hollow portion 3b of caulking pin 3 is spread outwards, i.e., deformed, causing the light shielding blade 2 to be held between the flat surface of the circular protrusion 3c and the deformed circular section 3b (shown by the dotted line).

Looking at FIG. 7, because the perimeter section 2a of the insertion hole light shielding blade 2 slants upward with respects to the rest of the blade 2b, the deformed hollow circular section does not protrude past the planar section of the light shielding blade 2b. This allows another light shielding blade 4 to be placed on top of light shielding blade 2 and provides clearances such that neither blade will collide with the other.

The main problem with the existing caulking pin pivot joint, as shown in FIGS. 6 and 7, is a deterioration in strength of both the light shielding blade and the caulking pin joint due to the extreme embossing performed on the light shielding blade 2. Specifically, the embossed section is susceptible to warping and cracking, which not only significantly reduces the strength of the joint, but also causes problems when the affected blade is stacked with other blades. The obvious solution would be to forego the embossing and use a simple flat blade structure. However, when a flat blade is connected to the arm 1 by means of the existing caulking pin 3, as shown in FIG. 6, the blades have a tendency to interfere with other blades due to the protuberance of the circular hollow section 3c. Further, the blades have a tendency to bow, which allows intermittent light past the shutter or aperture. To date, the only solution to this problem has been to increase the spacing between the light shielding blades, allowing some measure of light leakage.

The inventors have discovered the above-noted problems with current caulking pin joints and have developed solutions to these problems.

SUMMARY OF THE INVENTION

Accordingly, it is an object of the present invention to provide a caulking pin joint suitable for use in high speed shutter or aperture applications.

It is another object of the invention to provide a caulking pin joint simple in structure yet having a high strength.

It is a further object of the present invention to provide a caulking pin joint which protrudes only a small amount from the surfaces which it connects.

It is yet a further object of the invention to provide a caulking pin joint suitable for use with light shielding blades constructed from metal, plastic, and fiber-reinforced composites.

Additional objects and advantages of the invention will be set forth in part in the description which follows, and, in part, will be obvious from the description, or may be learned by practice of the invention.

The foregoing objects of the present invention are achieved by providing a non-embossed light shielding blade in conjunction with a caulking pin wherein the inner surface of the hollow circular section is chamfered such that, when deformed, it becomes almost flat Or takes on a slight curve. Therefore, even if another light shielding blade is placed adjacent to the joint, it will slide smoothly over the joint without excessive friction or distortion.

The above objects of the present invention may be also achieved with a flat light shielding blade in conjunction with a caulking pin wherein the inner surface of the hollow circular section is chamfered and the surface of the circular protruded section parallel to the light shielding blade is angled less than 15°. The caulking pin is applied using a dye and punch such that when the hollow cylindrical section is spread out, the light shielding blade is pressed against the angled surface of the circular protrusion and is deformed around the circular protrusion. Such deformation further decreases the amount of protuberance of the deformed hollow circular section while causing less structural damage than embossing.

The above objects of the present invention may be further achieved with a flat light shielding blade in conjunction with a caulking pin wherein the inner surface of the hollow cylindrical section is chamfered and the surface of the circular protrusion parallel to the light shielding blade is provided with a surface wherein the area closest to the hollow cylindrical section has an angle greater than 15° and the area furtherest away from the hollow cylindrical section is provided with an angle of 15° or less. When such a caulking pin is applied using a dye and punch, the caulking strength can be improved while the flatness of the blade as a whole is maintained.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
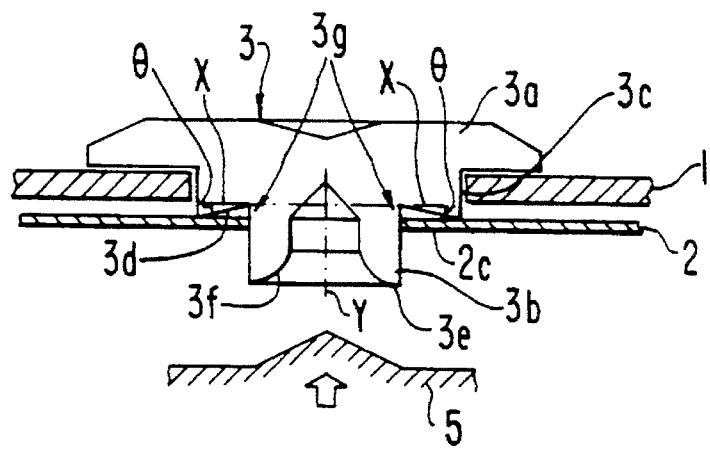
FIG. 1 is a cross-sectional view of a caulking pin joint according to the first embodiment of the present invention.

Reference will now be made in detail to the present preferred embodiments of the present invention, examples of which are illustrated in the accompanying drawings, wherein like reference numerals refer to like elements throughout.

FIG. 1 is a sectional view of a caulking pin joint in accordance with a first embodiment of the present invention. A caulking pin joint rotatably connects an arm 1 to a light shielding blade 2 through the use of a caulking pin 3. To effectuate the joint, both the arm 1 and blade 2 are provided with circular insertion holes for receiving caulking pin 3. Caulking pin 3 has a circular disc-shaped retaining head 3a, a cylindrical protrusion 3c for insertion into the insertion hole in arm 1, and a hollow cylindrical section 3b for insertion in the insertion hole in light shielding blade 2. The hollow cylindrical section 3b has an interior section 3f which is chamfered. In addition, the surface 3d of the circular protrusion 3c, which lies parallel to the plane of the light shielding blade 2, (plane X in FIG. 1 ) is tapered such that it forms an incline angle θ of up to 15°, in the direction of the edge 3e of the hollow circular projection 3b, i.e., the thinnest portion of circular projection 3c is at its interior periphery 3g.

In use, caulking pin 3 is inserted into the caulking pin insertion hole of arm 1, which thereafter rests on the retaining head 3a. Caulking pin 3 is then inserted into the caulking pin insertion hole of the light shielding blade 2, which thereafter rests on the circular protrusion 3c. The disc-shaped head 3a of the caulking pin 3 is seated onto a dye, not shown. Thereafter a punch 5 is moved toward the caulking pin, on a Y axis perpendicular to the plane of the light shielding blade X. The punch causes the hollow section 3b to be spread outwards towards the outside, i.e., the perimeter 2c, of the caulking pin insertion hole of the light shielding blade 2.

Figure 2:
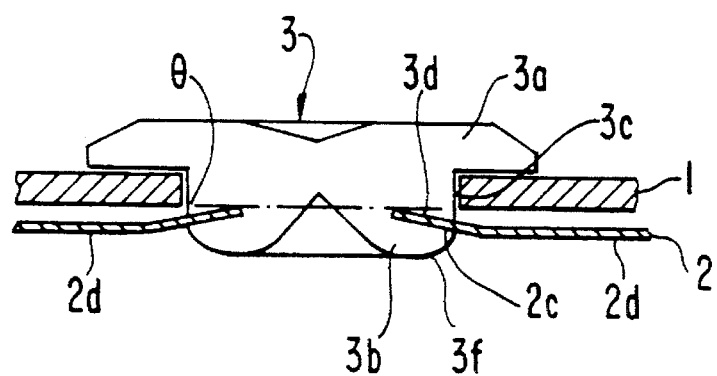
FIG. 2 is a cross-sectional view of a caulking joint in accordance with the first embodiment of the present invention.

FIG. 2 is a cross-sectional view of the caulking pin joint, as shown in FIG. 1, after the hollow cylindrical section 3b has been spread by punch 5. As can be seen, the light shielding blade 2 is held between the spread out hollow circular section 3b and the circular protrusion 3c. Further, the perimeter 2c of the light shielding blade along the caulking pin insertion hole has been deformed in accordance with the surface 3d of the circular protrusion 3c of the caulking pin 3. Specifically, the perimeter section 2c of the insertion hole of the light shielding blade 2 is inclined upward with respects to the surface of the blade 2. However, because the incline angle θ of the protruding surface 3d is less than or equal to 15°, only a small amount of bending deformation of the aforementioned perimeter section 2c occurs. This allows the caulking to be performed efficiently while securely fastening the blade to the arm without adversely affecting the flatness of the blade or decreasing the strength of the caulking joint.

Figure 3:
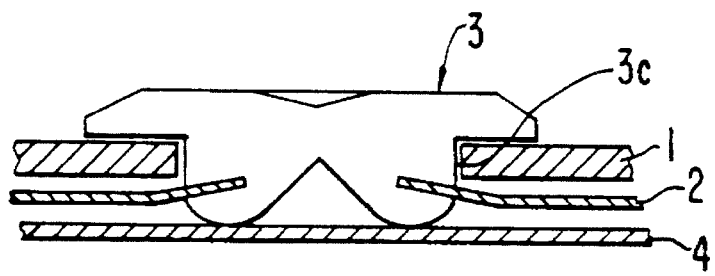
FIG. 3 is a cross-sectional view of a caulking joint in accordance with the first embodiment of the present invention.

Moreover, because the internal surface of the hollow circular section 3b is chamfered at section 3f, it only presents a slight protuberance after it has been spread out. Further, a significant portion of the protuberance of the deformed hollow section 3b is compensated for by the bent section 2c of the light shielding blade 2. As shown in FIG. 3, this allows a second light shielding blade 4 to be stacked on the first light shielding blade 2 in such a manner that friction and collisions do not interfere with either blades' operation. Additionally, due to the chamfering of the hollow cylindrical section 3b and the slight indenting of the periphery 2c of the caulking pin insertion hole of the light shielding blade 2, light shielding blade 4 can be placed in close proximity to light shielding blade 2, thereby reducing the gap between the blades and preventing light leakage.

Because the deformation around the caulking pin insertion hole is slight, and limited to no more than 15°, the light shielding blade can be made of stiffer materials than was heretobefore possible, such as fiber impregnated plastic. The reduced clearance between the blades also eliminates any deformation of the blades due to bowing, which further facilitates the use of lightweight materials having a high rigidity.

Although the first embodiment of the present invention has been described with respect to a specific configuration, it will be recognized that the first embodiment is not limited to the specific configurations. For example, although the first embodiment has been described with respect to the use of a dye and punch to deform the perimeter 2c of the insertion hole of the light shielding blade 2, an embossing operation can be performed on the blade prior to assembly.

Figure 4:
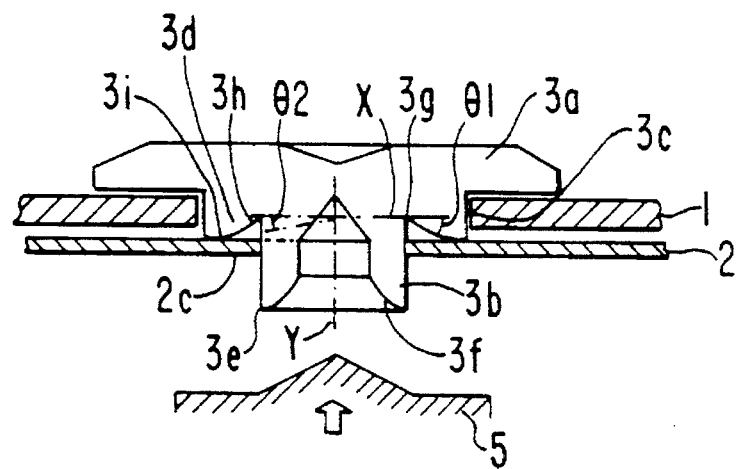
FIG. 4 is a cross-sectional view of a caulking joint in accordance with the second embodiment of the present invention.

FIG. 4 is a sectional view of a caulking pin joint in accordance with a second embodiment of the present invention. Like elements in the figures of the first and second embodiments are referred to by like reference numerals and the description of the like elements will not be repeated in detail here.

In accordance with the second embodiment of the present invention, the surface 3d of the circular protrusion 3c, upon which the light shielding blade 2 rests, is provided with a first inclined surface 3h and a second inclined surface 3i. The first inclined surface 3h is a sharply inclined ring-shaped tapered surface having an inclined angle $\theta_1$ which is equal to or larger than 15° with respects to the X-axis. The second inclined surface 3i, closer to the outer periphery of the circular protrusion 3d, is provided with an inclined tapered surface of less than or equal to 15° with respects to the X-axis.

Figure 5:
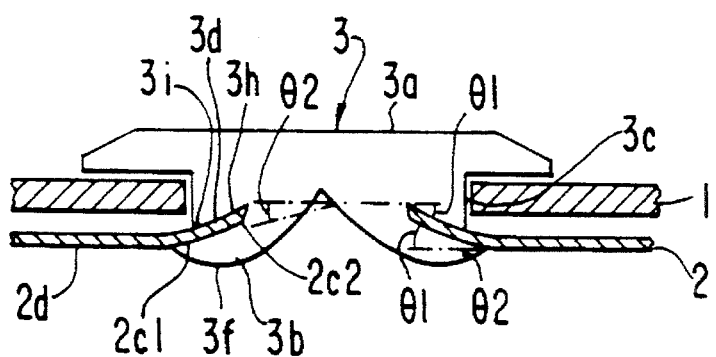
FIG. 5 is a cross-sectional view of a caulking joint in accordance with the second embodiment of the present invention.
Figure 6:
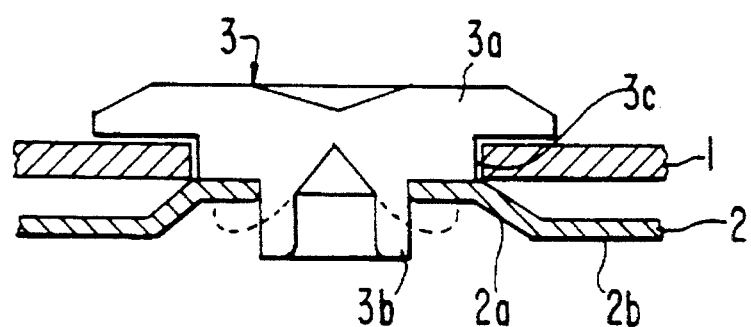
FIG. 6 is a cross-sectional view of a conventional caulking joint.
Figure 7:
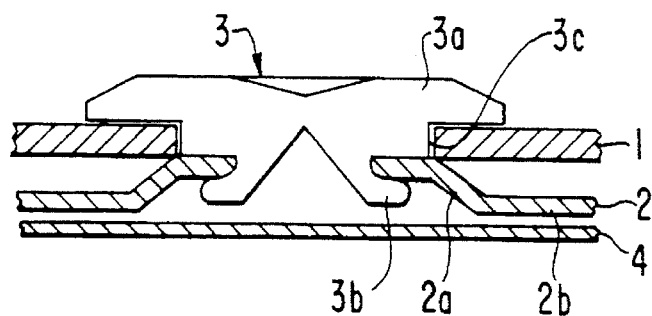
FIG. 7 is a cross-sectional view of a conventional caulking joint.

Looking at FIG. 5, the caulking pin joint is formed, as in the first embodiment, by seating the caulking pin 3 onto a dye and using a punch 5 (not shown in FIG. 5) to expand the hollow circular section 3b. However, due to the varied inclination of the surface of the circular protruding surface 3c, the light shielding blade is bent into two sections, 2c1 and 2c2. The section 2c1, resting on the second protruding surface 3i of the light shielding blade 2, is inclined with respect to the surface of the light shielding blade 2. However, since the inclined angle $\theta_2$ of the second protruding surface 3i is 15° or less, this inclination does not result in deformation which adversely affects the flatness of the blade as a whole. Similarly, the second section 2c1, resting on the first protruding surface 3h of the light shielding blade 2, while greatly inclined with respects to the surface of the light shielding blade 2, is only slightly bent with respects to the section 2c1 and therefore does not affect the rest of the light shielding blade 2. Overall, as the perimeter section of the caulking pin insertion hole of the light shielding blade 2 is not significantly bent. Therefore, caulking strength is improved while the flatness of the blade as a whole is maintained. Further, tests have shown that this structure is up to two times stronger than prior caulking pin joints, such as those shown in FIG. 6. For example, prior caulking pin joints can withstand approximately 1 kg.cm of pressure prior to losing structural strength, while a caulking pin joint in accordance with the present invention can withstand at least 0.2 kg.cm of pressure.

Although the second embodiment of the present invention has been described with respect to a specific configuration of the caulking pin, it will be recognized that the second embodiment is not limited to those specific configurations. For example, although the second embodiment has been described with respects to the use of a dye and punch to simultaneously deform the hollow circular section of the caulking pin with the light shielding blade, it will be recognized that the light shielding blade can be embossed prior to assembly. Further, it will be recognized that the surface 3d of the circular protuberance upon which the light shielding blade rests could be curved or provided with several different incline angles of 15° or less. However, with materials having high rigidity or low strength, as in the case of fiber reinforced composites, it is preferable to make the inclination angle of the protruding surface 10° or less.

Figure 8:
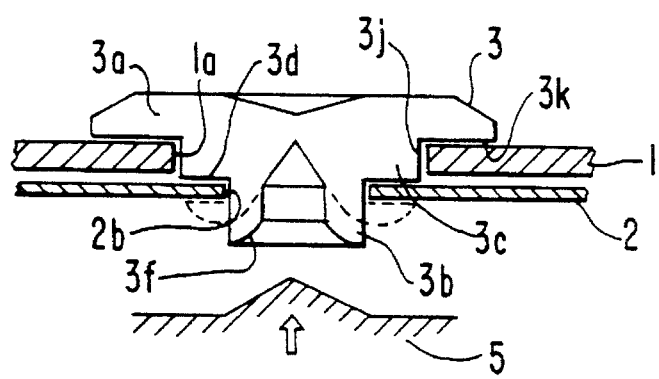
FIG. 8 is a cross-sectional view of a caulking joint in accordance with a third embodiment of the present invention.

FIG. 8 is a sectional view of a caulking pin joint in accordance with a third embodiment of the present invention. Like elements in the figures of the first, second and third embodiments are referred to by like reference numerals, and a description of like elements will not be repeated in detail here.

In accordance with the third embodiment of the present invention, the surface 3d upon which the light shielding blade 2 rests is not inclined with respects to the light shielding blade 2. In order to reduce the amount of protuberance of the hollow curve section 3b of the caulking pin 3, a chamfered section 3f is provided therein.

Figure 9:
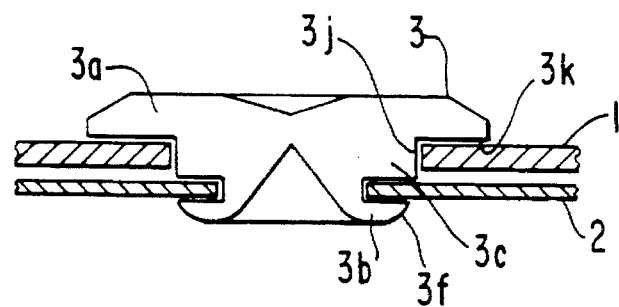
FIG. 9 is a cross-sectional view of a caulking joint in accordance with the third embodiment of the present invention.

Looking at FIG. 9, assembly is conducted in exactly the same manner with the first and second embodiments resulting in the light shielding blade 2 being firmly held in a planar condition between the protruding surface 3d and the deformed hollow cylindrical structure 3b. Arm 1 rotates around the inner surface 3j of circular protuberance 3c and lies against the retaining surface 3kj of retaining head 3a. The amount that the distorted hollow cylindrical section 3b protrudes past the light shielding blade 2 is limited by the chamfered section 3f. Therefore, another light shielding blade adjacent to the light shielding blade will slide easily over the deformed hollow cylindrical section 3b.

The caulking pin joint in accordance with the third embodiment of the present invention does not require the light shielding blade 2 to be deformed, and is particularly suitable for use with materials that would otherwise crack or suffer fatigue if they were embossed or bent. It is therefore possible to use materials which were, heretofore, unusable to create shutters that are surprisingly light, fast and therefore highly suitable for ultra-high speed shutter constructions. The simple structure of the caulking pin joint in accordance with a third embodiment of the present invention also displays an advantage in that it is technically easier to construct, and requires only minimal skill to assemble.

Although the third embodiment of the present invention has been described with respect to specific configurations, it will be recognized that the third embodiment is not limited to those specific configurations. For example, although the third embodiment has been described with respects to a chamfered surface it will be recognized that other surfaces, such as curves can be employed in accordance with the third embodiment of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A caulking pin for connecting an arm to a light shielding blade, the arm being provided with a first insertion hole, the light shielding blade being provided with a second insertion hole, the caulking pin comprising:

a retaining head;

a first protrusion depending from said retaining head; and a second protrusion having inner and outer walls depending from said first protrusion, said inner wall of said second protrusion being chamfered.

2. A caulking pin, as recited in claim 1, wherein:

said first protrusion has a first surface extending between said outer wall of said second protrusion and the perimeter of said first protrusion; and said first surface of said first protrusions is substantially perpendicular to the outer wall of said second protrusion.

3. A caulking pin, as recited in claim 2, wherein said first surface of said first protrusion is curved.

4. A caulking pin, as recited in claim 2, wherein said first surface of said first protrusion has an angle of inclination that increases toward said outer wall of said second protrusion with respect to a plane perpendicular to said outer wall.

5. A caulking pin, as recited in claim 4, wherein said angle of inclination of said first surface of said first protrusion is up to and including 15° adjacent the periphery of said first protrusion and greater than or equal to 15° adjacent said outer wall of said second protrusion.

6. A caulking pin, as recited in claim 2, wherein said first surface of said first protrusion is inclined with respect to a plane perpendicular to said outer wall of said second protrusion.

7. A caulking pin, as recited in claim 6, wherein said first surface is inclined up to and including 15° with respect to a plane perpendicular to said outer wall of said second protrusion.

8. A caulking pin, as recited in claim 6, wherein said first surface is inclined up to and including 10° with respect to a plane perpendicular to said outer wall of said second protrusion.

9. A light shielding blade assembly comprising:
at least one substantially planar light shielding blade provided with a first insertion hole;
at least one arm for actuating the light shielding blade assembly, said arm being provided with a second insertion hole; and
a caulking pin including:
a retaining head positioned over said second insertion hole in contact with said arm;
a first protrusion depending from said retaining head extending through said second insertion hole; and
a second protrusion having inner and outer surfaces depending from said first protrusion extending through said first insertion hole, said inner surface of said second protrusion being chamfered and deformed so as to secure said light shielding blade against said first protrusion.

10. A light shielding blade assembly, as recited in claim 9, wherein:
said first protrusion has a first surface extending between said outer wall of said second protrusion and the perimeter of said first protrusion; and
said first surface of said first protrusion is parallel to the surface of said light shielding blade.

11. A light shielding blade assembly, as recited in claim 11, wherein said first surface is inclined up to and including 10° with respect to the plane of said light shielding blade.

12. A light shielding blade assembly, as recited in claim 13, wherein said first surface of said first protrusion is curved with respect to the plane of said light shielding blade.

13. A light shielding blade assembly, as recited in claim 10, wherein:
said first surface of said first protrusion is inclined with respects to the plane formed by said light shielding blade; and
an area of said light shielding blade around said first insertion hole is inclined to lie substantially flush with said first surface of said first protrusion.

14. A light shielding blade assembly, as recited in claim 13, wherein said first surface is inclined up to and including 15° with respect to the plane of said light shielding blade.

15. A light shielding blade assembly, as recited in claim 13, wherein said first surface of said first protrusion has an angle of inclination that increases toward said outer wall of said second protrusions with respect to the plane of said light shielding blade.

16. A light shielding blade assembly, as recited in claim 15, wherein said angle of inclination of said first surface of said first protrusion is up to and including 15° adjacent the periphery of said first protrusion and greater than or equal to 15° adjacent said outer wall of said second protrusion.

17. A light shielding blade assembly comprising:
at least one substantially planar light shielding blade, said light shielding blade being provided with a first insertion hole;
at least one arm for actuating the light shielding blade assembly, said arm being provided with a second insertion hole having a diameter greater than the diameter of said first insertion hole;
a caulking pin including:
a disk shaped retaining head having a diameter greater than the diameter of said second insertion hole, said retaining head being positioned over said second insertion hole in contact with said arm;
a circular protrusion depending from said disk support retaining head extending through said second insertion hole; and
a ring-shaped protrusion having an inner and an outer surface depending from said circular protrusion extending through said first insertion hole, said inner surface of said ring-shaped protrusion being chamfered;
said circular protrusion having a first surface extending between said outer wall of said ring-shaped protrusion and the perimeter of said circular protrusion,
said first surface being inclined with respect to the plane of said light shielding blade;
said ring-shaped protrusion being deformed so as to secure said light shielding blade against said circular protrusion; and
the area of said light shielding blade around the periphery of said first insertion hole being inclined to lie flush against the first surface of said circular protrusion.

18. A light shielding blade assembly, as recited in claim 17, wherein said first surface is inclined up to and including 15° with respect to the plane of said light shielding blade.

19. A light shielding blade assembly, as recited in claim 17, wherein said first surface of said circular protrusion is curved with respect to the plane of said light shielding blade.

20. A light shielding blade assembly, as recited in claim 17, wherein said first surface of said circular protrusions has an angle of inclination that increases toward said outer wall of said ring-shaped aperture with respect to the plane of said light shielding blade.

21. A light shielding blade apparatus having an arm and a plurality of light shielding blades, said light shielding blade apparatus comprising:
a caulking pin for rotatably attaching the plurality of light shielding blades to the arm, said caulking pin having an annular offset surface, said caulking pin having a hollow ring body portion depending from said annular offset surface;
said hollow ring body portion having a chamfered internal peripheral surface;
said caulking pin being inserted through a hole in the arm;
said caulking pin being inserted through a hole in at least one of the light shielding blades; and
said hollow ring body portion being flared outwards to rotatably secure the light shielding blade against said annular offset surface, the chamfered internal peripheral surface of the flared hollow ring body portion presenting a gentle sloping surface protruding from the periphery of the light shielding blade deformed and secured by said hollow ring body portion.

22. A light shielding blade apparatus, as recited in claim 21, wherein the area of said annular offset surface that is adjacent said hollow ring body portion is formed with an annular tapered surface having a slope of up to and including 15° in the direction of said ring body portion.

23. A light shielding blade apparatus, as recited in claim 22, wherein said annular tapered surface of said annular offset surface is formed at a right angle to the concentric shaft of said hollow ring body portion.

24. A light shielding blade apparatus, as recited in claim 22, wherein the interior portion of said annular tapered surface lying next to said ring body portion has a slope of greater than or equal to 15° in the direction of said ring body portion and the exterior portion of said annular tapered surface has a slope of up to and including 15° in the direction of said ring body portion.

25. A light shielding blade apparatus, as recited in claim 22, wherein the light shielding blades are formed from fiber reinforced composite material.

26. A light shielding blade apparatus, as recited in claim 24, wherein said annular tapered surface of said annular offset surface is formed with a slope up to and including 10° in the direction of said ring body portion.

* * * * *

UNITED STATES PATENT AND TRADEMARK OFFICE
CERTIFICATE OF CORRECTION

PATENT NO.   :   5,541,694
DATED        :   July 30, 1996
INVENTOR(S)  :   Takashi MATSUBARA, et al.

It is certified that error appears in the above-indentified patent and that said Letters Patent is hereby corrected as shown below:

Column 7, line 37, delete "11" and insert -- 13 --.

Column 7, line 40, delete "12" and insert -- 14 --.

Column 7, line 41, delete "13" and insert -- 11 --.

Column 7, line 43, delete "13" and insert -- 11 --.

Column 7, line 51, delete "14" and insert -- 12 --.

Column 7, line 52, delete "13" and insert -- 11 --.

Column 7, line 55, delete "13" and insert -- 11 --.

Signed and Sealed this

Third Day of June, 1997

Attest:

BRUCE LEHMAN

*Attesting Officer*       *Commissioner of Patents and Trademarks*